United States Patent
Niese et al.

(10) Patent No.: US 12,037,190 B2
(45) Date of Patent: Jul. 16, 2024

(54) MAGAZINE STORAGE UNIT FOR STORING SMALL PARTS, STORAGE ARRANGEMENT, AND METHOD FOR COMMISSIONING WITH THE MAGAZINE STORAGE UNIT

(71) Applicant: KEPLOC GMBH, Neumarkt i.d. Opf. (DE)

(72) Inventors: Matthias Niese, Neumarkt (DE); Florian Süss, Happurg (DE); Jörg Franzke, Neumarkt (DE); Fabian Bodensteiner, Erlangen (DE)

(73) Assignee: KEPLOC GMBH, Neumarkt i.d. Opf. (DE)

( * ) Notice: Subject to any disclaimer, the term of this patent is extended or adjusted under 35 U.S.C. 154(b) by 1018 days.

(21) Appl. No.: 16/760,783

(22) PCT Filed: Oct. 30, 2018

(86) PCT No.: PCT/EP2018/079664
§ 371 (c)(1),
(2) Date: Aug. 4, 2020

(87) PCT Pub. No.: WO2019/086426
PCT Pub. Date: May 9, 2019

(65) Prior Publication Data
US 2020/0399059 A1 Dec. 24, 2020

(30) Foreign Application Priority Data
Nov. 2, 2017 (DE) ..................... 10 2017 125 579.6

(51) Int. Cl.
*G06F 7/00* (2006.01)
*B65G 1/04* (2006.01)
*G07F 11/50* (2006.01)

(52) U.S. Cl.
CPC ............. *B65G 1/045* (2013.01); *G07F 11/50* (2013.01)

(58) Field of Classification Search
CPC ................................ B65G 1/045; G07F 11/50
(Continued)

(56) References Cited

U.S. PATENT DOCUMENTS 3,224,825 A 12/1965 Sturgis
8,145,351 B2 * 3/2012 Schininger ............. G07F 9/009
221/12

(Continued)

FOREIGN PATENT DOCUMENTS

EP 1627829 A1 2/2006
EP 2607867 A1 6/2013
(Continued)

*Primary Examiner* — Yolanda R Cumbess
(74) *Attorney, Agent, or Firm* — LUCAS & MERCANTI, LLP; Klaus P. Stoffel

(57) ABSTRACT

It is known that in particular components or component accessories are stored in a storage in industrial production. To this end, a depot storage unit for storing small parts is proposed, having a base frame, a rotary table, wherein the rotary table is rotatably supported on the base frame and is rotatable relative to the base frame and wherein the rotary table includes a base plate, a drive device, wherein the drive device is operatively connected to the rotary table, so that the drive device rotates the rotary table, a plurality of receiving boxes, wherein the receiving boxes are arranged on the base plate in the direction of rotation, wherein the depot storage unit includes at least or exactly one sensor device for detecting a weight of at least or exactly one of the receiving boxes.

14 Claims, 6 Drawing Sheets

(58) Field of Classification Search
USPC .......................................... 700/213–214, 231
See application file for complete search history.

(56) References Cited

U.S. PATENT DOCUMENTS

2006/0259195 A1  11/2006  Eliuk
2007/0043469 A1   2/2007  Draper

FOREIGN PATENT DOCUMENTS

| JP | S62196205 A | * | 8/1987 |
| JP | S62196205 A | | 8/1987 |
| JP | 2002345928 A | | 12/2002 |
| KR | 20160089344 A | | 7/2016 |
| WO | 2014158017 A1 | | 10/2014 |

* cited by examiner

MAGAZINE STORAGE UNIT FOR STORING SMALL PARTS, STORAGE ARRANGEMENT, AND METHOD FOR COMMISSIONING WITH THE MAGAZINE STORAGE UNIT

CROSS-REFERENCE TO RELATED APPLICATIONS

The present application is a 371 of International application PCT/EP2018/079664, filed Oct. 30, 2018 which claims priority of DE 10 2017 125 579.6, filed Nov. 2, 2017, the priority of these applications is hereby claimed and these applications are incorporated herein by reference.

BACKGROUND OF THE INVENTION

The invention relates to a depot storage unit for storing small parts. The invention further relates to a storage arrangement with the depot storing unit and a method for order picking with the depot storing unit.

It is known that in industrial production, in particular components or component accessories are kept in a storage. For the storage and controlled provision of small parts for assembly, rotary storages, for example, are known, which in their simplest form have a rotatably mounted disc. The disc may have a plurality of deposit or storage compartments, wherein individual tray segments may also be arranged on the disc for the storage of small parts. Furthermore, rotary storages with a controllable rotary drive are known, wherein an automated rotation of the disc is achieved by the rotary drive.

The document CH 681 884 A5, which probably represents the closest state of the art, describes a mobile, programmable storage for the temporary storage and programmed supply of micro-technical small parts, in the form of bulk material, with a plurality of individual tray segments that are able to be moved radially outwards, wherein an electrically driven, rake-controlled, rotatably and vertically movable cylinder stack is provided, which consists of flat rings arranged one above the other and is connected to form a unit by means of a spacer bolt, the ring surfaces serving as a guide for a number of shell segments divided as required, such that, in the retracted state, they form a ring, are guided at the bottom, top and sides with an exact fit, the individual segments being provided on the underside with a groove-shaped guide and a recoil spring which, on the one hand, is located at the groove end of the outer part of the shell segment, on the other hand are each mounted on a guide piece fixed to the flat ring and that by means of this guide the individual shell segments are moved individually out of the centre by three-quarters of the shell length with a pressure cylinder controlled by a deflection lever, to release the shell recess and thus to remove the programmed small part.

SUMMARY OF THE INVENTION

It is the object of the invention to create a depot storage unit which is characterised by improved operating behaviour. Furthermore, it is the object of the invention to create a corresponding storage arrangement as well as a method with the depot storing unit.

The subject of the invention is a depot storage unit, which is designed and/or suitable for the storage of small parts. The depot storage unit is designed in particular as a rotary storage. Preferably, the depot storage unit is designed as a stationary or mobile storage unit. For example, the depot storage unit is used to store semi-finished parts and/or finished parts and/or accessories, e.g. screws etc.

The depot storage unit has a base frame. In particular, the base frame can form a stand for the depot storage unit. Alternatively, the base frame can be connected to a separate stand. Alternatively or optionally additionally, the base frame or stand can have several swivel castors, so that the depot storage unit is designed as the mobile storage unit.

The depot storage unit has a rotary table, wherein the rotary table is rotatably mounted on the base frame and is rotatable relative to the base frame about a rotation axis. In particular, the base frame and the rotary table are arranged coaxially and/or concentrically with respect to the axis of rotation. The rotary table is preferably designed as a rotationally symmetrical body. Preferably, the rotary table defines the axis of rotation with its axis of rotation and/or its axis of symmetry. The base frame can have several rollers, wherein the rotary table preferably rests on the rollers and is supported by them in the direction of rotation with respect to the axis of rotation. Alternatively, the rotary table can also be mounted opposite the base frame via a central rotary storage.

The rotary table has a base plate. In particular, the base plate is designed as a circular or annular plate, one surface of the base plate in particular being designed as a circular surface or an annular surface. Particularly preferably, the base plate extends in a radial plane in relation to the axis of rotation. For example, the base plate has a diameter of more than 400 mm, preferably more than 900 mm, in particular more than 1400 mm. For example, the base plate can be designed as a metal plate or a plastics plate.

The depot storage unit has a drive device. In particular, the drive device may be housed in and/or firmly connected to the base frame. The drive device is preferably designed as an electric or an electromechanical drive device. For this purpose, the drive unit preferably has an engine, in particular an electric engine.

The drive device is operatively connected to the rotary table so that the drive device rotates the rotary table about the axis of rotation. In particular, the drive device generates a drive torque, wherein the drive torque is transmitted to the rotary table so that it rotates around the axis of rotation. The drive device can be positively and/or frictionally and/or non-positively connected to the rotary table. In particular, the engine is connected to the rotary table via a transmission device. The transmission device can be designed as a traction drive or a gear drive.

The depot storage unit has a plurality of receiving boxes, the receiving boxes being arranged on the base plate in the direction of rotation with respect to the axis of rotation. In particular, the boxes can be centred or fixed in position on the base plate. The receiving boxes are preferably used for sorting small parts. The receiving boxes are in particular designed as open fronted storage bins and/or as tray segments. Particularly preferably, each of the receiving boxes has a circle segment-shaped base area. The receiving boxes may be directly adjacent to each other, but alternatively, the receiving boxes may be spaced apart in the circumferential direction. Preferably, all receiving boxes have the same bulk volume. Alternatively, at least some of the receiving boxes may have a different bulk volume from the rest of the receiving boxes. For example, one or some of the receiving boxes have a bulk volume of more than 0.1 litre, preferably more than 1 litre, and in particular not more than 10 litres. In particular, the depot storage unit has more than ten, preferably more than twenty, and in particular more than forty of the receiving boxes.

In the context of the invention, it is proposed that the depot storage unit has at least or exactly one sensor device which is designed and/or suitable for detecting a weight of at least or exactly one of the receiving boxes. The sensor device serves in particular to detect the total weight of exactly one receiving box. The total weight is preferably defined by an empty weight of the receiving box and, where appropriate, by a filling weight of a box content. Preferably the depot storage unit has exactly one sensor device. Alternatively, the depot storage unit can have several sensor devices, wherein, for example, one sensor device can be assigned to each of the receiving boxes. The sensor device is in particular designed as a force transducer. Particularly preferably, the sensor device is designed as a load cell.

The sensor device is preferably connected to an evaluation device through signalling technology, wherein the evaluation device can determine a filling level of the receiving boxes on the basis of the detected weight.

In particular, when calibrating the system, the empty weight of each individual receiving box can be stored as a fixed value in the evaluation device. For example, the evaluation device can determine the filling level on the basis of the filling weight. For this purpose, the evaluation device can calculate the filling weight by means of the total weight detected by the sensor device minus the empty weight stored in the evaluation device.

The advantage of the invention is in particular the fact that the sensor device enables simple and cost-effective monitoring of the filling level of the receiving boxes. Furthermore, the sensor device can detect, for example, an overload of the depot storage unit and output a notification. This can significantly increase the operational reliability and service life of the depot storage unit.

In a preferred configuration of the invention, the sensor device remains stationary relative to the base frame when the rotary table is rotated. In particular, the sensor device is located below the base plate and/or within the base frame. During an operation of the depot storage unit, in particular the drive device, the rotary table with the receiving boxes rotates around the axis of rotation, wherein in particular the sensor device is deactivated. When the rotary table is at a standstill, the sensor device is preferably activated, wherein the sensor device can detect the weight of the corresponding receiving box, which is preferably located in the area of the sensor device. Due to the stationary arrangement of the sensor device only one sensor device is necessary to detect the weight of one of the receiving boxes. Thus, a cost-effective production of the depot storage unit can be realized.

In a further concrete configuration, the depot storage unit has a lifting device, wherein the lifting device remains stationary relative to the base frame when the rotary table is rotated. The lifting device is used in particular to lift or lower at least or exactly one of the receiving boxes from the base plate. In particular, the lifting device is located below the base plate and/or within the base frame. Preferably the lifting device is firmly connected to the base frame. The lifting device preferably lifts one of the receiving boxes when the rotary table is at a standstill, so that the receiving box is spaced from the base plate. The lifting device can then lower the box so that the box rests on the base plate. The lifting device can be used to automatically provide at least one of the receiving boxes so that, for example, the removal of small parts from the receiving box is made easier.

In a preferred concretization, the lifting device is designed as a rocking lever mechanism, the lifting device having an adjustment actuator and a lever arm with a support portion. In particular, the lever arm is rotatably mounted about a swivel joint in the base frame. When the adjustment actuator is actuated, the lever arm is adjustable so that one of the receiving boxes is lifted or lowered over the support portion. The support portion is preferably used to support the receiving box during the lifting or lowering process of the lifting device. When actuating the adjustment actuator, it is preferable to apply a force to the lever arm, in particular in the axial direction with respect to the axis of rotation, so that the lever arm is rotated about a rotation point. By designing the lifting device as a rocking lever mechanism, a robust and simple implementation of the lifting device is thus proposed.

The support portion may have at least one support pin to support the receiving box to be lifted. In particular, the support portion has at least three, preferably exactly four of the support pins, so that in particular a stable support of the receiving box is achieved by the support pins. The base plate may have several receiving openings for receiving the support pin, with corresponding receiving openings preferably being provided under each of the receiving boxes, in particular in the area of the base of the receiving boxes. It is particularly preferred that each receiving box has the same number of receiving openings as the support portion has on the support pins.

When the receiving box is lifted, the at least one support pin or each of the support pins can be passed through one of the corresponding receiving openings so that the receiving box rests on the support pin. In particular, the receiving openings have a larger diameter than the support pin, so that the support pin is or can be located within the receiving opening with a clearance. Preferably, when the rotary table is at a standstill, the support pin extends at least partially, in particular completely, through the corresponding receiving opening, wherein rotation of the base plate in the direction of rotation with respect to the axis of rotation is blocked. When the rotary table is rotated, the support pin and the receiving openings are disengaged so that the base plate can be rotated in the direction of rotation with respect to the axis of rotation.

In a preferred implementation, the lifting device has the sensor device, wherein when one of the receiving boxes is lifted, the weight of the associated receiving box is simultaneously detectable by the sensor device. In particular, the support portion comprises the sensor device, wherein a force transmission to the sensor device is implemented via the at least one support pin. It is preferable that the box be lifted far enough from the base plate so that it is in particular fully spaced from the base plate. This allows the total weight of the receiving box to be transferred completely to the support portion or sensor device, which allows the total weight of the lifted receiving box to be determined precisely.

In a further concrete implementation, at least or exactly one of the receiving boxes for the removal of small parts is arranged at a removal site. The depot storage unit has exactly one removal site, wherein the small parts can be removed automatically or manually at the removal site. In particular, exactly one of the receiving boxes is provided at the removal site so that one or more small parts can be removed from the receiving box.

The sensor device and/or the lifting device are located at the removal point. In particular, the lifting device makes one of the receiving boxes available at the removal site by lifting it. Preferably, the receiving box is moved away from the base plate in the axial and/or radial direction in relation to the axis of rotation, so that the lifted receiving box stands out from the other receiving boxes. The sensor device can monitor the removed small parts at the removal site, so that the process reliability of the depot storage unit can be significantly increased.

In a concrete constructional configuration, the rotary table has a circumferential rim portion. In particular, the rim portion is formed as a narrow web, which is directly attached to the base plate. The base frame is particularly preferably arranged in a radial direction in relation to the axis of rotation inside the rim portion. Preferably, the rim portion closes off the base frame from the outside. The drive unit is arranged radially inside the rim portion and is connected to the rim portion with drive technology. Preferably, the drive device is directly connected to the rim portion so that the drive torque can be transmitted to the rim portion. In particular, a transmitting means of the drive device or transmission device may be connected to the rim portion. Preferably, the transmitting means is applied positively and/or non-positively and/or frictionally against an inner circumference of the rim portion. For example, the means of transmission may be designed as a traction means, in particular a belt, and/or a driving wheel. When the rotary table is rotated, the drive device remains stationary relative to the rotary table.

In a further concretization, the depot storage unit has a further sensor device, wherein an angular rotation position of the rotary table in the direction of rotation is able to be detected by the further sensor device. In particular, the further sensor device is designed as a rotary encoder. In principle, the further sensor device can be designed as an absolute value encoder, wherein the absolute value encoder detects an absolute angular rotation position of the rotary table. However, the further sensor device is particularly preferably designed as an incremental encoder, wherein the incremental encoder detects a change in the angular rotation position of the rotary table.

The further sensor device as well as the drive device and/or the lifting device are preferably connected to the evaluation device by signalling technology. Preferably, the evaluation device can output an actuation signal for the drive device and/or the lifting device on the basis of the detected angular rotation position. Preferably, a first actuation signal is output by the evaluation device in a detected ACTUAL angular rotation position and a second actuation signal is output by the evaluation device when a TARGET angular rotation position is reached.

Preferably, the drive unit rotates the rotary table on the basis of the first actuation signal until the TARGET angular rotation position is detected by the further sensor unit. In particular, the drive device is deactivated based on the second actuation signal, so that further rotation of the rotary table is stopped. As an alternative or optional supplement, the lifting actuator is actuated on the basis of the first and/or the second actuation signal. In particular, the receiving box is lowered on the basis of the first actuation signal and raised on the basis of the second actuation signal.

For example, the rim portion may have a toothing, with the toothing extending circumferentially in the direction of rotation with respect to the axis of rotation. The toothing is particularly preferably on a radial inner side of the rim portion. In particular, the toothing is used for scanning by the incremental encoder, wherein the incremental encoder is designed as a gear wheel encoder for this purpose. Thus, the toothing serves as a measuring standard for the further sensor equipment. Alternatively or as an optional supplement, the drive and/or transmission device can be designed as a gear drive or transmission. Preferably, the transmission means is designed as a gear wheel, wherein the gear wheel can engage with the toothing so that the drive torque can be transmitted to the rim portion.

In a possible configuration, the depot storage unit has a casing, with the receiving boxes located inside the casing. The casing can be connected to the base frame or the rotary table in a rotationally fixed manner. In particular, if the rotary table is rotated, the casing remains stationary relative to the rotary table. Preferably the casing is designed as a hollow cylinder, with the casing extending in the direction of rotation in relation to the main axis. In particular, the base frame and/or rotary table is arranged radially with respect to the axis of rotation within the casing.

The casing has a removal opening, the removal opening forming the or another removal site for one of the receiving boxes, and the other receiving boxes being covered by the casing. In particular, the casing may be interrupted in the direction of rotation with respect to the axis of rotation, so that the removal opening is formed. Alternatively, the removal opening can also be designed as a punch hole or cut-out. Preferably, the removal opening should be at least as wide as the maximum width of one of the receiving boxes. It is particularly preferable to place only one of the receiving boxes in the area of the removal opening at a time, thus preventing access and thus removal of the receiving boxes covered by the casing.

In particular, the sensor device and/or the lifting device are located at the removal site formed by the removal opening. Thus, the casing allows a simple and cost-effective design of the removal site, while at the same time defining a clear position of the removal site.

As an optional supplement, the removal opening can be closed by a closing device. The closing device serves in particular to block and/or cover the removal site so that the removal of small parts is prevented. For example, the locking device can be designed as a flap or a sliding door. The closing device can be actuated manually or automatically. It is preferable to open the closing device when small parts are removed at the removal site. In particular, the sealing device is closed again after removal. Optionally, the closure device can be connected to the evaluation device with signalling technology.

Another subject of the invention relates to a storage arrangement with the depot storing unit. Preferably, the depot storage unit is designed as described above.

In another preferred configuration, the storage arrangement has at least one additional depot storage unit. The two depot storage units are preferably each designed as identical modules, with each depot storage unit being designed as an independent system. For example, the storage arrangement may have more than three, preferably more than six, and in particular more than ten of the depot storage units. Preferably, each of the depot storage units can be operated independently of the other depot storage units. As an alternative or optional supplement, all depot storage units are connected to a common central evaluation device.

In principle, all depot storage units can be geometrically and/or functionally identically designed. Alternatively, the depot storage units can also be designed differently in terms of geometry and/or function. In particular, the depot storage unit has a first story diameter and the other depot storage unit has a second story diameter, wherein the first and second story diameters are different.

Each of the depot storage units has a lower and an upper interface, wherein the upper interface of one depot storage unit is complementary to the lower interface of the other depot storage unit. In particular, the interfaces with one another form contour partners so that the depot storage units are preferably connected and/or connectable with one another in a positive and/or non-positive and/or frictional manner. As an alternative or optional supplement, data can be exchanged via the interfaces.

In particular, all lower interfaces of the depot storage units and all upper interfaces of the depot storage units are designed to be the same or identical so that the depot storage units can be stacked on top of each other and/or exchanged as desired. Thus, the modular depot storage units can be used to create the multi-story rotary storage. For example, a first story is formed by the depot storage unit and a second story by the further depot storage unit.

In a further preferred concretization, the storage arrangement has an input device, wherein the input device is connected by signalling technology to the depot storage unit and/or the rotary storage. In particular, the input device is designed as a portable computer. For example, the input device can be designed as a tablet, a smartphone, or a notebook etc. Particularly preferably, the input device is connected and/or connectable to the depot storage unit(s), in particular the evaluation device, via a radio connection, e.g. Bluetooth, infrared, W-LAN etc.

The input device is designed to control the depot storage unit and/or the rotary storage. In particular, the input device is used to control the drive device and/or the lifting device. The input device is preferably designed to control the drive device of the depot storage unit and/or the drive device of the further depot storage unit. In particular, a certain angle of rotation position can be set via the input device, so that an associated receiving box is made available to the further depot storage unit(s).

The depot storage unit has an optional lighting system. The lighting device is preferably located at the extraction point. For example, the lighting device is designed as a single light-emitting diode or a light source, in particular an LED light source. The input device can be designed to control the lighting system, for example. The lighting system is preferably used to mark the removal site so that in particular the corresponding receiving box can be located quickly. Preferably, the lighting device may be located at the removal site so that the corresponding receiving box is illuminated. The input device can preferably be used to switch the lighting device on or off and/or control it. Optionally, the luminous intensity and/or the colour of the lighting device can be changed.

All depot storage units can preferably be controlled by the input device. In particular, the input device can be used to select a specific receiving box, and a corresponding control signal can be output to the drive device based on the angular rotation position. The drive device preferably rotates the rotary table until the TARGET angular rotation position is detected by the further sensor device and the selected receiving box is positioned at the removal site. Particularly preferably, a certain angular rotation position is assigned to each of the boxes.

As an alternative or optional supplement, the input device is designed to display information from the depot storage unit and/or the rotary storage. In particular, the information comprises a filling level of the individual receiving boxes and/or a number of available receiving boxes and/or a number of available stories and/or information on the contents of the receiving boxes, for example article description and/or article number and/or quantities and/or weight per article. Preferably, exactly one article type can be assigned to each receiving box, wherein preferably each small part of the respective article type is designed identically. Particularly preferably, small parts of a certain type of article have the same weight per piece. Thus, for example, on the basis of the calculated filling weight by the weight per piece, the number of small parts for the corresponding receiving box can be determined.

In a further embodiment of the invention, a sequence of different angular rotation positions can be determined via the input device so that the receiving boxes are made available in a determined order.

In particular, the input device can be used to create a "playlist", wherein a concrete selection and/or order of the receiving boxes can be determined by the input device. Particularly preferably, the receiving boxes can be selected and "played" across stories. In particular, "during playback" the selected receiving boxes are made available one after the other at the removal site(s). For example, the receiving boxes each remain at the removal site for a certain period of time. Alternatively, after the removal of one or more small parts, the next receiving box is transported to the removal site, wherein the corresponding receiving box remains available for removal at the removal site until a specified number of pieces and/or a specified filling weight is no longer reached. As an optional supplement, the closing device and/or the lighting device is controlled on the basis of the "playlist" so that the removal site is accessible and/or marked.

In a further development of the invention, the input device is designed to display and/or control the filling level of the receiving boxes on the basis of weight. In particular, the filling level is represented or displayed as the filling weight or the number of pieces. Preferably the filling level can be displayed graphically via the input device.

The input device outputs a notification in case of a deviation of a maximum and/or a minimum filling level value. In particular, the notification can be represented graphically and/or acoustically. For example, if the fill level falls below the minimum level, a graphic and/or a text message and/or a signal tone can be output as the notification, so that the user can, for example, refill the corresponding receiving box with the associated article at an early stage. As an alternative or optional supplement, an automatic reorder of the article can be transmitted to the corresponding supplier as the notification.

As an alternative or optional supplement, if the maximum filling level value is exceeded, a further graphic and/or text message and/or a further signal tone can be output as the notification, so that further filling of the receiving box is interrupted. This reduces overfilling of the receiving boxes and prevents overloading of the depot storage units.

Another subject of the invention relates to a method of order picking with the depot storage unit and/or the depot storage unit in a storage arrangement as described above. In one method step, the rotary table is rotated relative to the base frame about the axis of rotation by the drive device. In particular, the drive torque is transmitted from the drive unit to the rotary table, preferably the rim portion. Preferably, the rotary table is rotated from the first to the second angular rotation position. Preferably the first or the second angular rotation position is detected by the further sensor device. In the first angular rotation position, the evaluation device can transmit the first actuation signal to the drive device and/or the lifting device. In particular, the drive device is activated and/or the lifting device is lowered on the basis of the first actuation signal. During the rotation of the rotary table, the receiving boxes are carried along in the direction of rotation around the axis of rotation, with the sensor device remaining stationary.

When the second angular rotation position has been reached, the second control signal is transmitted from the evaluation device to the drive device and/or the lifting device, e.g. on the basis of the change in the angular rotation position detected by the further sensor device. In particular, when the second angular rotation position is reached, the drive device is stopped so that the rotary table comes to a standstill. In particular, the drive device is deactivated and/or the lifting device is raised on the basis of the second actuation signal. In a further method step, when the rotary table is at a standstill, a weight of at least or exactly one of the receiving boxes is detected by the sensor device. Particularly preferably, when lifting or when the receiving box is in a lifted position, as the weight of the lifted receiving box is detected by the sensor device. Preferably, the weight is detected until a specified number of pieces or a specified filling weight is reached and/or exceeded and/or undercut. Particularly preferably, all method steps can be repeated as often as desired.

As an optional supplement, the lighting device can be activated in particular when the second angular rotation position is reached and/or on the basis of the second actuation signal. Preferably, the removal site is illuminated until, for example, a specified quantity of small parts has been removed.

Optionally, a "playlist" can be created with the input device. In particular, a sequence of different angular rotation positions is approached by the drive device on the basis of the "playlist". Preferably, this means that the receiving boxes are made available at the removal site in a determined order one after the other.

Furthermore, a possible sequence of exemplary method steps is described according to the following list:
First step: Rotation of the rotary table by the drive unit
Second step: Lifting of one of the receiving boxes by the lifting device
Third step: Detection of a weight of the lifted receiving box by the sensor device
Fourth step: Illumination of the receiving box by the lighting device
Fifth step: Lowering of the receiving box by the lifting device In particular, the steps can be repeated as often as required. In particular, the third and fourth steps can be repeated within one pass until the quantity of small parts removed corresponds to the specified value, after which the fifth step is carried out.

BRIEF DESCRIPTION OF THE DRAWING

Further features, advantages and effects of the invention result from the following description of preferable exemplary embodiments of the invention. Therein.

DETAILED DESCRIPTION OF THE INVENTION

Parts that correspond to each other or are identical are marked with the same reference signs in the figures.

Figure 1:
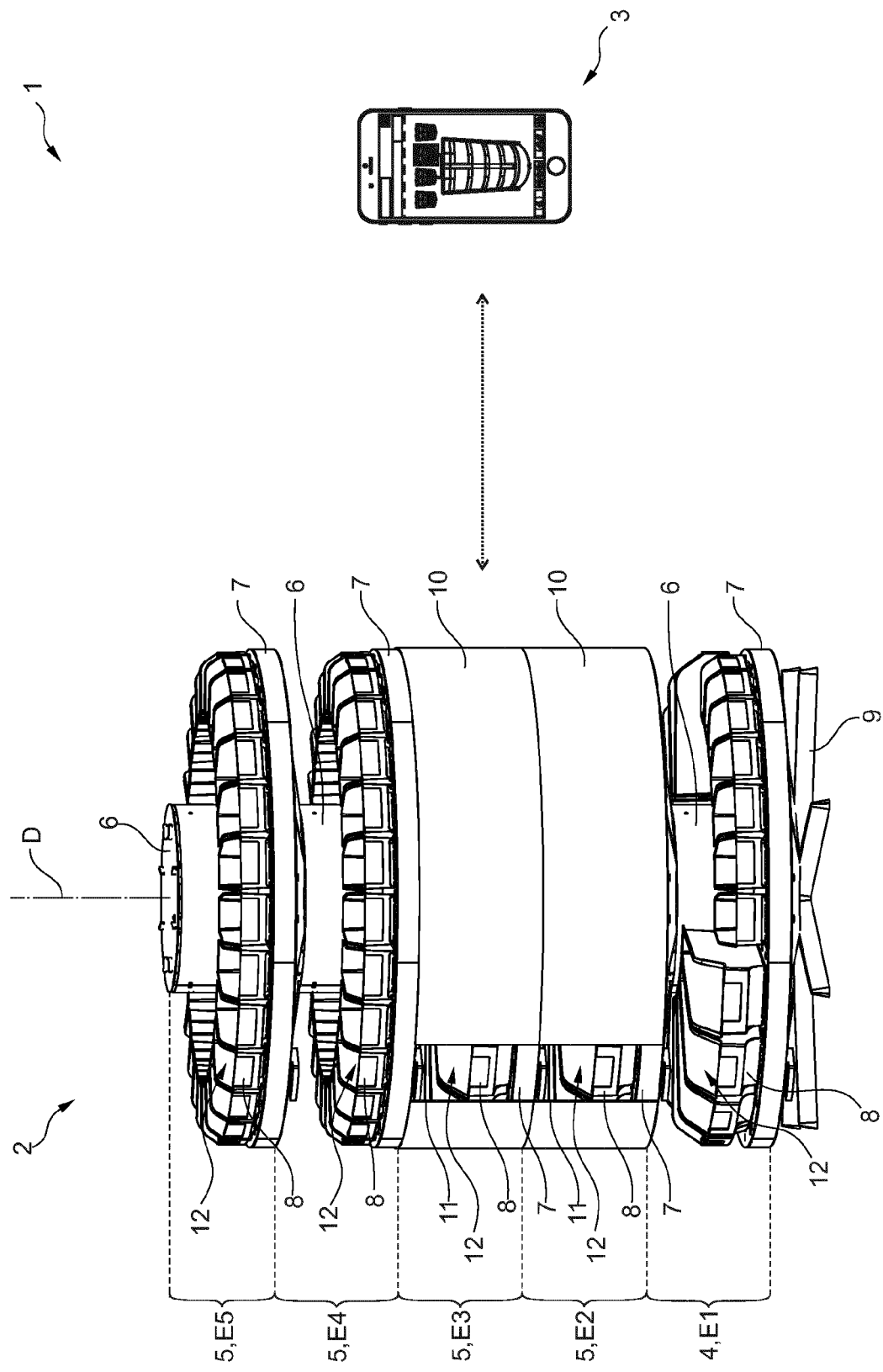
FIG. 1 shows a three-dimensional representation of a storage arrangement as an exemplary configuration of the invention.

FIG. 1 shows in a three-dimensional representation a storage arrangement 1, where storage arrangement 1 has a rotary storage 2 and an input device 3. The rotary storage 2 is used in particular for storing small parts, e.g. screws, component parts, etc. The rotary storage 2 has a depot storage unit 4 and four further depot storage units 5, wherein the depot storage unit 4 forms a first story E1 and the further depot storage units 5 form a second to fifth story E1-5.

The depot storage units 4, 5 each have a base frame 6, a rotary table 7 and several receiving boxes 8 arranged on the rotary table 7. The receiving boxes 8 have a circle segment-shaped base area and are arranged in a circle in the direction of rotation with respect to the axis of rotation D. For example, the receiving boxes 8 all have the same bulk volume. Alternatively, however, some of the receiving boxes 8 may have a different bulk volume from the rest. For example, the receiving boxes 8 or some of the receiving boxes 8 have a bulk volume of 0.3 litres or 1.8 litres or 4.6 litres.

The rotary table 7 can be rotated relative to the base frame 6 about the rotation axis D, wherein the base frame 6 remains stationary. The individual base frames 6 of the depot storage units 4, 5 are firmly connected to each other, wherein the depot storage unit 4 is connected to a stand 9. For example, each of the depot storage units 4, 5 can be operated independently of the others.

The two further depot storage units 5 on the second and third levels E2, E3 each have a casing 10. For example, the casing 10 is connected to the base frame 6, so that the casing 10 remains fixed to the frame when the rotary table 7 is rotated. The casing 10 is designed as a cylindrical casing, wherein the casing 10 is interrupted in the direction of rotation, thus forming a removal opening 11 in the casing 10. For example, the removal opening 11 can be additionally closed or covered by a closing device, not shown.

The depot storage units 5 each have a removal site 12 for removing small parts from one of the receiving boxes 8. The removal sites 12, for example, are all arranged one above the other at the same position. For example, the small parts can be removed manually at the removal site 12. In particular, the removal opening 11 forms the removal site 12 of the second and third stories E2, E3. The receiving boxes 8 are arranged inside the casing 10, wherein the receiving box 8 arranged at the removal site 12 is freely accessible. The remaining boxes 8 are covered by the casing 10, so that access to them is prevented. For example, the removal sites 12 can each be additionally illuminated by a light source, not shown, so that the receiving box 8 located at a removal site 12, in particular the contents thereof, is illuminated. This also allows a clear identification of the removal site 12 to be realized. The input device 3 serves in particular to control and/or display information from the rotary storage 2 or at least one of the depot storage units 4, 5. For this purpose, the input device 3 is connected to the rotary storage 2 with signalling technology, for example via a wireless connection. For example, the input device 3 may be designed as a portable computer, in particular a smartphone or tablet.

Figure 2:
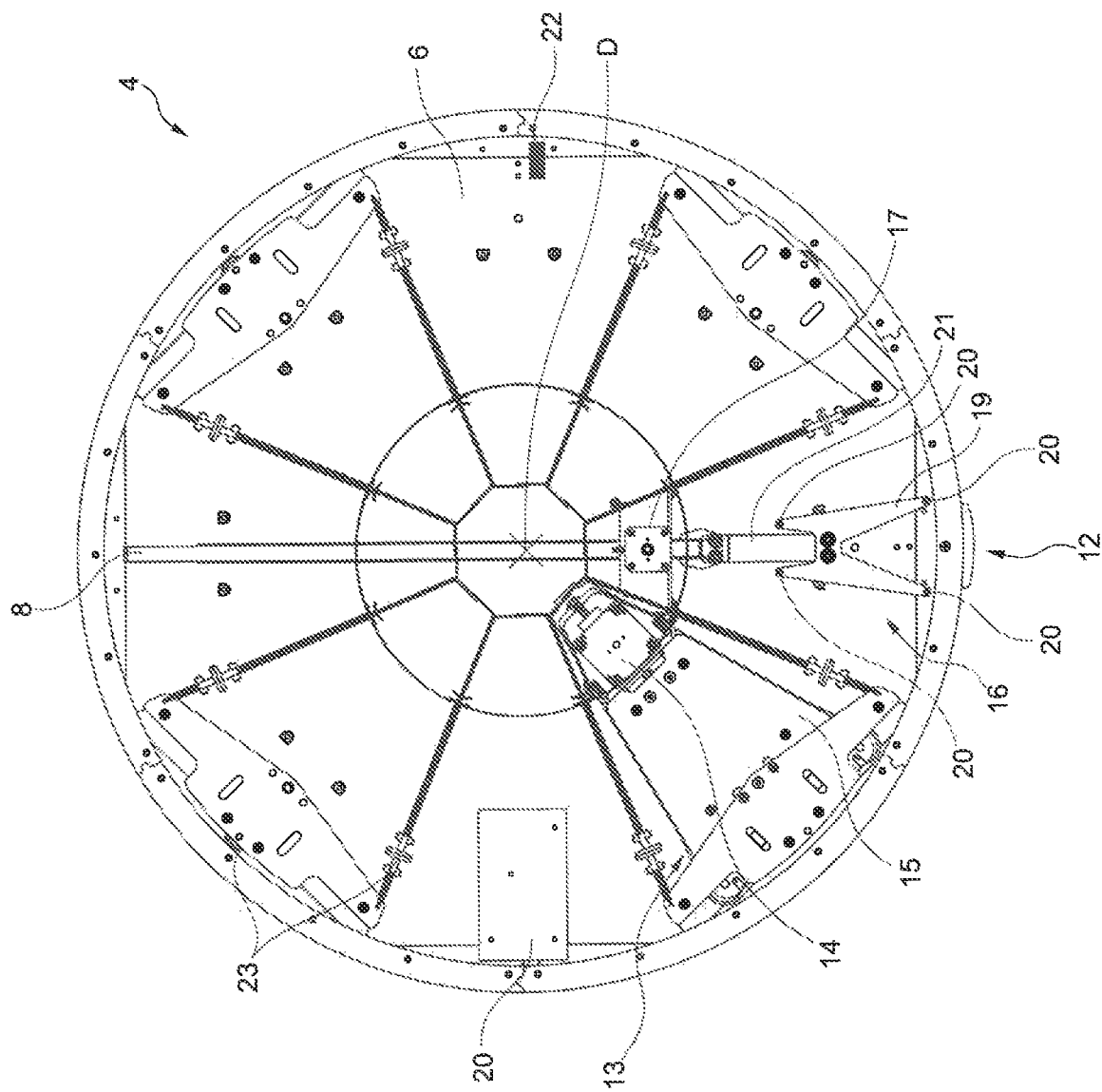
FIG. 2 shows a plan view of a depot storage unit of the storage arrangement.

FIG. 2 shows the depot storage unit 4, from FIG. 1, in an axial plan view in relation to the axis of rotation D. The base frame 6 can consist of several individual circle segment-shaped sheet metal components, so that the base frame 6 has at least an approximate circular ring-shaped contour in a projection from above.

The depot storage unit 4 has a drive device 13, wherein the drive device 13 is arranged radially with respect to the axis of rotation D within the base frame and is connected to it in a rotationally fixed manner. The drive device 13 is drive-connected to the rotary table 7 so that the drive device 13 rotates the rotary table 7 in the direction of rotation with respect to the axis of rotation D. The drive device 13 comprises an engine 14, e.g. an electric engine, and a transmission device 15, wherein a driving torque is generated by the engine 14 and transmitted via the transmission device 15 to the rotary table 7.

The depot storage unit 4 has a lifting device 16, wherein the lifting device 16 has an adjustment actuator 17, a lever arm 18 and a support portion 19. The support portion 19 is located at the end of the lever arm 18. The lifting device 16 is located inside the base frame 6 with respect to the axis of rotation D and is firmly connected to it. The lifting device 16 is used to lift or lower one of the receiving boxes 8. The support portion 19 has four support pins 20, wherein the receiving box 8 rests on the support pins 20 when lifted or lowered. The lifting device 16 is located at the removal site 12. For example, the lifting device 16 makes one of the receiving boxes 8 available at the removal site 12 by lifting.

Furthermore, the depot storage unit 4 has a sensor device 21, wherein the sensor device 21 is designed to detect a weight of exactly one of the receiving boxes 8. Preferably the lifting device 16 has the sensor device 21. The sensor device 21 is operatively connected to the support portion 19, so that when the receiving box 8 is lifted, a weight force of the receiving box 8 is transferred to the sensor device 21 via the support portion 19. For example, the sensor device 21 is designed as a load cell.

The depot storage unit 4 has a further sensor device 22, wherein the further sensor device 22 is located within the base frame 6. The further sensor device 22 is used to detect a rotation angle position of the rotary table 7. For example, the sensor device 22 is designed as an incremental encoder, wherein the sensor device 22 detects a change in the angular rotation position. The base frame 6 has several rollers 23 evenly distributed in the direction of rotation, wherein the rotary table 7 is rotatably mounted on the base frame 6 via the rollers 23. When the rotary table 7 is rotated, the drive device 13, the lifting device 16 as well as the sensor device 21 and the other sensor device 22 remain stationary relative to the base frame 6.

Figure 3:
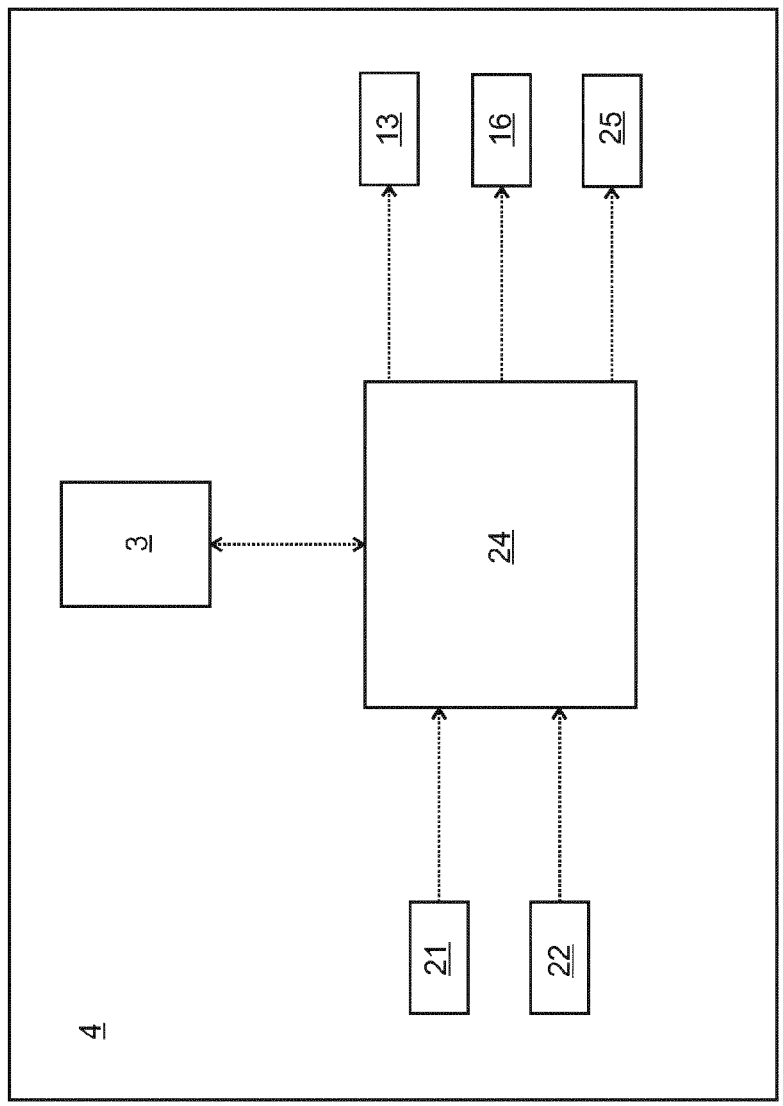
FIG. 3 shows the depot storage unit in a schematic representation with an evaluation device.

FIG. 3 shows the depot storage unit 4 in a highly simplified schematic representation. The depot storage unit 4 has an evaluation device 24, wherein the input device 3, the drive device 13, the lifting device 16, the sensor device 21, the further sensor device 22 and at least one lighting device 25 are connected to the evaluation device 24 with signalling technology.

For example, when calibrating the depot storage unit 4, an empty weight from each of the receiving boxes 8 can be detected by the sensor device 21 and stored in the evaluation device 24. Optionally in addition to this, the further sensor device 22 may detect the associated angular rotation position of the weighed receiving box 8, so that each receiving box 8 is stored with a unique angular rotation position and the associated empty weight in the evaluation device 24.

After the calibration phase, the receiving boxes 8 can be filled so that the receiving boxes 8 are loaded with an additional filling weight. Thus, the empty weight and the filling weight result in a total weight that can be detected by the sensor device 21. The sensor device 21 transmits the detected total weight to the evaluation device 24, wherein the filling weight of the receiving box 8 can be determined on the basis of the total weight. For this purpose, for example, the stored empty weight of the receiving box 8 is subtracted from the total weight, wherein the value of the difference corresponds to the filling weight.

The evaluation device 24 can then determine the filling level of the weighed receiving box 8, for example, on the basis of the filling weight. For this purpose, for example, a maximum value can be set for the filling weight, and the filling level can be determined based on a difference between the maximum value and the calculated filling weight. Alternatively, exactly one article type is assigned to each of the receiving boxes 8, wherein each part of the article type is identically designed. For example, the weight per piece for each article type can be stored in the evaluation device 24, wherein a number of the small parts arranged in the associated receiving box 8 can be calculated on the basis of the filling weight and the weight per piece.

The evaluation device 24 can output an actuation signal for the drive device 13 and/or the lifting device 16 on the basis of the detected angular rotation position. For example, to rotate the rotary table 7 from an ACTUAL angular rotation position to a TARGET angular rotation position, a first actuation signal is output by the evaluation device 24. For example, the support portion 19 can be lowered and then the rotary table 7 can be rotated in the direction of rotation by the drive unit 13. When the TARGET angular rotation position is reached, this is detected by the other sensor device 22. Based on the detected TARGET angular rotation position, a second actuation signal is output by the evaluation device 24. For example, the support portion 19 and thus the receiving box 8 can be lifted so that the weight can be detected by the sensor device 21. Thus, an ACTUAL position is reached again, wherein the steps described can be repeated as often as required.

For example, individual receiving boxes 8 can be selected via the input device 3. Based on the associated angular rotation positions, the drive device 13 rotates the rotary table 7 until the selected receiving box 8 is located, for example, at the removal site 12 as shown in FIG. 1. As an alternative or optional supplement, the input device can be used to set, for example, the luminous intensity and/or the colour of the lighting device 25.

Figure 4:
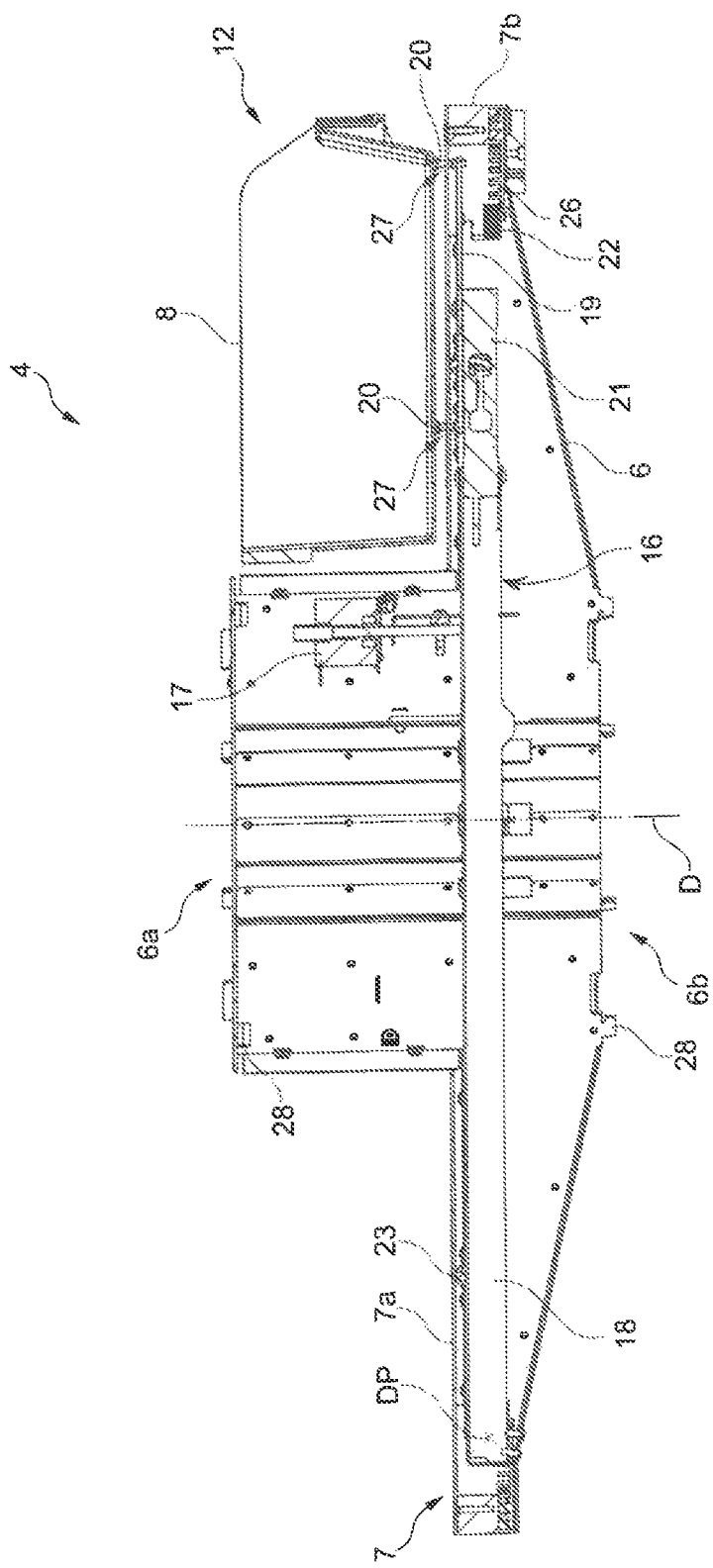
FIG. 4 shows a sectional view of the depot storage unit of FIG. 2.

FIG. 4 shows a longitudinal section through the lifting device 16 along the axis of rotation D of the depot storage unit 4 of FIG. 2. The rotary table 7 has a base plate 7a and a surrounding rim portion 7b. The rim portion 7b extends in the axial direction with respect to the axis of rotation D in the direction of the base frame 6. The base frame 6 is arranged in the radial direction with respect to the axis of rotation D within the rim portion 7b, with the rim portion 7b closing the base frame 6 in the radial direction. The rim portion 7b is flush with an outer edge of the base plate 7a, wherein the rim portion 7b can, for example, be designed as a separate component and is connected to the base plate 7a in a positive and/or material and/or frictional and/or non-positive manner.

The rim portion 7b may have toothing 26 on its radial inner side with respect to the axis of rotation D, the toothing 26 extending completely in the circumferential direction with respect to the axis of rotation D. For example, the toothing 26 serves as a measuring standard for the further sensor device 22. For example, the further sensor device 22 is designed as a gear wheel encoder, so that the further sensor device 22 can determine the position of the angle of rotation by scanning the toothing 26.

The base plate 7a has a circular base area, with the receiving boxes 8 resting on the base plate 7a. The base plate 7a is mounted coaxially to the axis of rotation D on the base frame 6, with the base plate 7a resting on the rollers 23 for this purpose. Furthermore, the base plate has a number of receiving openings 27 to receive the support pins 20. For example, each of the receiving boxes 8 is assigned four of the receiving openings 27.

The lever arm 18, for example, is designed as a bending beam and/or is mounted via a swivel joint to rotate about a rotation point DP within the base frame 6. When the lifting device 16 is actuated, the adjustment actuator 17 applies a positioning force to the lever arm 18 in the axial direction with respect to the axis of rotation D, so that the lever arm 18 rotates about the rotation point DP. The support portion 19 is located below the base plate 7a, wherein when the receiving box 8 is lifted or lowered, the support pins 20 are each guided through one of the corresponding receiving openings 27. The receiving box 8 rests mainly on the support pins 20, wherein the receiving box 8 is completely spaced from the base plate 7a when lifted. This means that only the weight of the lifted receiving box 8 acts on the sensor device 21 via the support portion 19, so that an exact detection of the weight is achieved. During rotation of the rotary table 7, the support pins 20 are arranged outside the receiving openings 27 so that the rotary table 7 can be rotated unhindered in the direction of rotation.

The base frame 6 has an upper and a lower interface 6a, b, wherein the two interfaces 6a, b are each complementary with further interfaces of the other depot storage units 5. For example, the basic frames 6 of all depot storage units 4, 5 are identical in construction, so that, for example, the lower interface 6a of the depot storage unit 4 is complementary to an upper interface of the other depot storage unit 5. Thus, the number of depot storage units 4, 5 of the rotary storage 2 of FIG. 1 can be varied as desired. For example, the two interfaces 6a, b each have several connecting elements 28, wherein the connecting elements 28 form contour partners amongst each other. For example, the individual depot storage units 4, 5 can be connected to each other via a plug/turn connection. Thus, a positive and/or non-positive and/or frictional connection between the interfaces 6a, b of the depot storage units 4, 5 can be achieved. As an optional supplement, data can be exchanged via the two interfaces 6a, b, e.g. via a contact plug.

Figure 5:
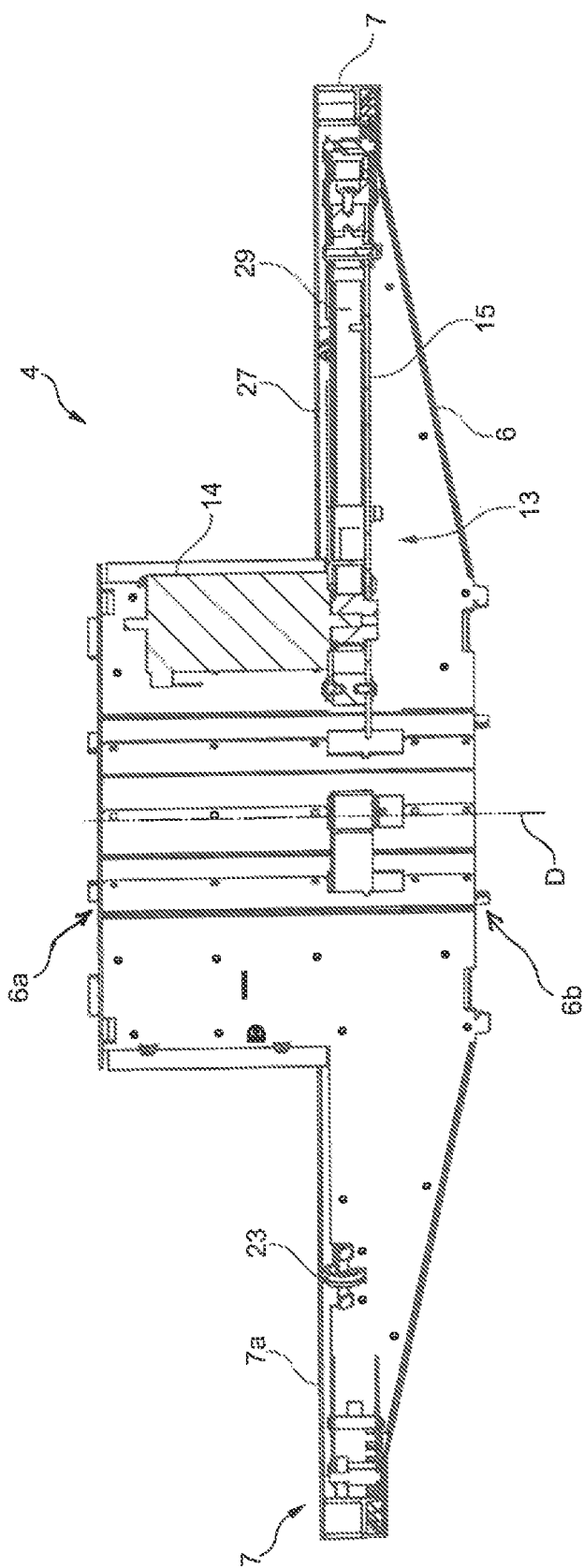
FIG. 5 shows a further sectional view of the depot storage unit of FIG. 2.

FIG. 5 shows a longitudinal section through the drive unit 13 in the same manner as FIG. 4. The transmission device 15 has a transmitting means 29, wherein the transmitting means 29 transmits the drive torque of the engine 14 to the rotary table 7. For example, transmission device 15 is designed as a belt drive, wherein the transmission means 29 is designed as a toothed belt or flat belt etc. The transmitting means 29 is operatively connected to the rim portion 7b, wherein a torque path runs from the engine 14 via the transmitting means 29 to the rim portion 7b. For example, the transmission device 15, in particular the transmitting means 29, is frictionally and/or non-positively connected to the rim portion 7b.

Figure 6C:
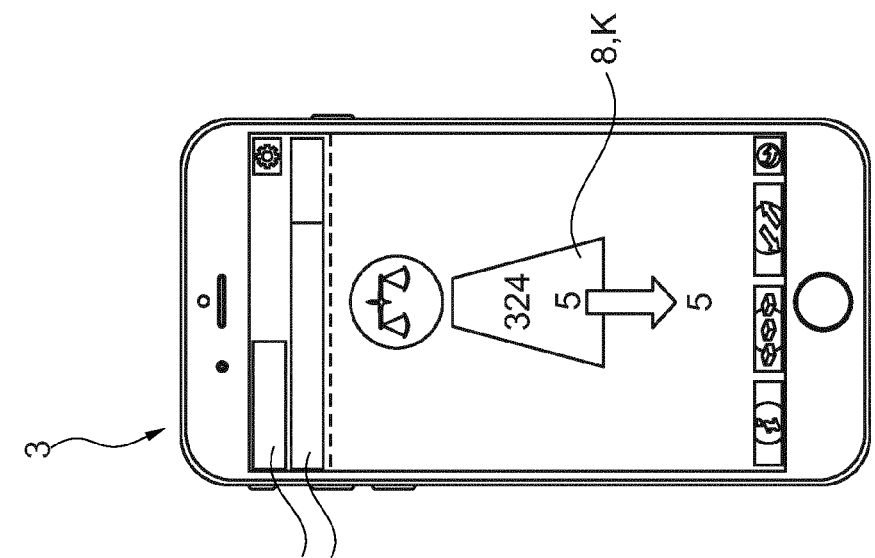
FIG. 6a-c shows different user interfaces of an input device of the storage arrangement of FIG. 1.
Figure 6B:
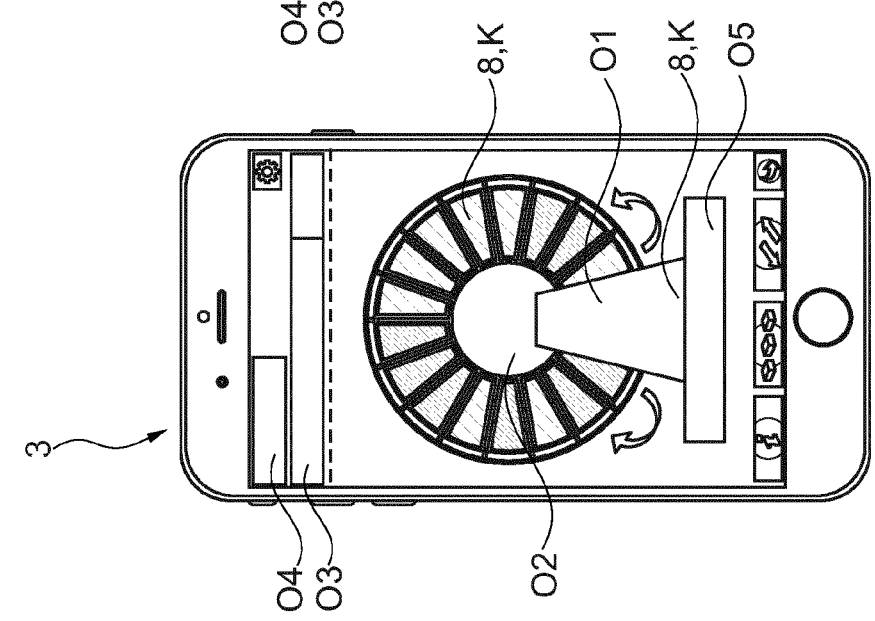
Figure 6A:
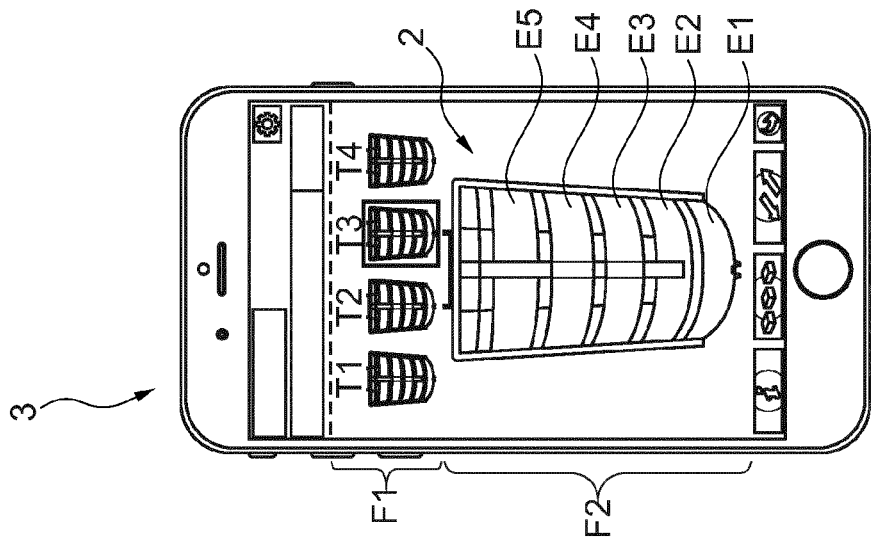

FIGS. 6a, b, c show different variants of the user interface of input device 3. In the example shown, input device 3 is designed as a smartphone, wherein the user interfaces can be part of a program, in particular application software.

FIG. 6a shows a main menu of the program, wherein the main menu shows a first window portion F1 and a second window portion F2. In the first window portion F1, several of the rotary storages 2 are shown as buttons, wherein the number of buttons can vary depending on the number of available rotary storages. In the design example shown, the storage arrangement 1, for example, has four of the rotary storages T1 to T4, wherein one of the rotary storages T1 to T4 can be selected via the button. By selecting the rotary storages T1 to T4, the selected rotary storage is displayed enlarged in the second window portion F2. The individual stories E1 to E5 are also displayed as buttons and can be selected via these, wherein the number of buttons can vary depending on the number of stories available.

Selecting one of the stories E1 to E5 opens a first window, as a submenu, which is shown in FIG. 6b. In the first window, one of the stories E1 to E5 is shown in a top view. All receiving boxes 8 of the selected story E1 to E5 are shown as circle segments K. The individual circle segments K are also designed as buttons so that each of the receiving boxes 8 can be selected individually. For example, the receiving boxes 8 can be colour-coded, wherein, for example, the circle segments of the freely assignable receiving boxes 8 have a different colour than the circle segments K of the already assigned receiving boxes 8. As an alternative or optional addition, a "playlist" can be created in the first window. For this purpose, a sequence of selected receiving boxes 8 can be defined, wherein the sequence can then be "played back". In this case, the selected receiving boxes 8 are provided one after the other, for example, at the removal site 12.

By selecting one of the circle segments K, it is enlarged and a first option button O1 opens. For example, the first option button O1 shows the filling level of the selected receiving box 8 as number of pieces or filling weight. For example, a second option button O2, which is located centrally in the middle of the screen of the input device 3, displays the name of the selected receiving box, which is uniquely assigned to the selected receiving box. Preferably, by selecting one of the circle segments K, a signal is transmitted to the evaluation device 24, so that the rotary table 7 is turned and the selected receiving box 8 is made available at the removal site 12. A third and a fourth option button O3, O4 are located at the top of the first window. The third option button O3 is used, for example, to display an article description of the selected receiving box 8. The fourth option button O4 is used, for example, to display an article number of the selected receiving box 8.

The first window also has a fifth option button O5, the fifth option button O5 being designed as a button. The fifth option button O5 can be used, for example, for article assignment, wherein each of the receiving boxes 8 is assigned exactly one article type. By selecting the fifth option field O5, the corresponding article type, in particular the corresponding article number and/or the article description, is assigned to the selected receiving box 8.

FIG. 6c shows a second window, as a further submenu, which opens, for example, during a removal. Here, for example, the selected circle segment K of FIG. 6b is shown, which is in particular also arranged at the removal site 12. In the case of a removal, for example, the quantity removed is displayed as a number of pieces. For example, a notification can be output in case of a deviation of a maximum or minimum fill level value, and an automatic repeat order or text message can be output based on the notification, for example.

LIST OF REFERENCE NUMERALS

1 Storage arrangement
2 Rotary storage

3 Input device
4 Depot storage unit
5 Further depot storage unit
6 Base frame
6a Upper interface
6b Lower interface
7 Rotary table
7a Base plate
7b Rim portion
8 Receiving boxes
9 Stand
10 Casing
11 Removal opening
12 Removal site
13 Drive device
14 Engine
15 Transmission device
16 Lifting device
17 Adjustment actuator
18 Lever arm
19 Support portion
20 Support pins
21 Sensor device
22 Further sensor device
23 Rollers
24 Evaluation device
25 Lighting device
26 Toothing
27 Receiving openings
D Axis of rotation
E1-5 first to fifth story
F1 First window portion
F2 Second window portion O1-5 First to fifth option button
K Circle segments
T1-4 Rotary storage

The invention claimed is:

1. A depot storage unit for storing small parts, comprising:
a base frame,
a rotary table that is rotatably supported on the base frame, the rotary table including a base plate and the rotary table being rotatable relative to the base frame about an axis of rotation,
a drive device operatively connected to the rotary table, the drive device being configured to rotate the rotary table about the axis of rotation,
a plurality of receiving boxes arranged on the base plate in the direction of rotation, and
at least one sensor device for detecting a weight of one or more of the receiving boxes, wherein the depot storage unit includes a lifting device, wherein at least one of the receiving boxes is able to be lifted from the base plate by the lifting device, and wherein the lifting device remains stationary relative to the base frame when the rotary table is rotated.

2. The depot storage unit according to claim 1, wherein the sensor device remains stationary relative to the base frame when the rotary table is rotated.

3. The depot storage unit according to claim 1, wherein the lifting device is configured as a rocking lever mechanism, the lifting device includes an adjustment actuator and a lever arm having support portion, wherein the lever arm is adjustable when the adjustment actuator is operated so that one of the receiving boxes is moved over the support portion.

4. The depot storage unit according to claim 1, wherein the lifting device includes the sensor device, wherein, while lifting one of the receiving boxes, the weight of the receiving box that is lifted is able to be detected by the sensor device.

5. The depot storage unit according to claim 1, wherein, in order to remove small parts, at least one of the receiving boxes is able to be arranged at a removal site, wherein at least one of the sensor device and the lifting device is arranged at the removal site.

6. The depot storage unit according to claim 1, wherein the rotary table has a circumferential rim portion, wherein the drive device is arranged radially within the rim portion and is operatively connected to the rim portion, wherein the drive device remains stationary relative to the rotary table when the rotary table is rotated.

7. The depot storage unit according to claim 1, further comprising a further sensor unit configured to detect an angular rotation position of the rotary table.

8. The depot storage unit according to claim 1, wherein the receiving boxes are arranged within a casing having a removal opening that constitutes a removal site for one of the plurality of receiving boxes and the other of the plurality of receiving boxes are covered by the casing, and wherein the casing remains stationary relative to the rotary table when the rotary table is rotated.

9. A storage arrangement, comprising a rotary storage that includes a depot storage unit for storing small parts, the depot storage unit comprising:
a base frame,
a rotary table that is rotatably supported on the base frame, the rotary table including a base plate and the rotary table being rotatable relative to the base frame about an axis of rotation,
a drive device operatively connected to the rotary table, the drive device being configured to rotate the rotary table about the axis of rotation,
a plurality of receiving boxes arranged on the base plate in the direction of rotation, and
at least one sensor device for detecting a weight of one or more of the receiving boxes, wherein the depot storage unit includes a lifting device, wherein at least one of the receiving boxes is able to be lifted from the base plate by the lifting device, and wherein the lifting device remains stationary relative to the base frame when the rotary table is rotated.

10. The storage arrangement according to claim 9, wherein the storage arrangement includes at least one additional depot storage unit, wherein each of the depot storage units has a lower and an upper interface, wherein the upper interface of one of the depot storage units is complementary to the lower interface of another depot storage unit so that a multistory rotary storage is created.

11. The storage arrangement according to claim 9, wherein the storage arrangement includes an input device, wherein the input device is connected to at least one of the depot storage unit and the rotary storage by signaling technology, wherein the input device is configured to at least one of control and display information of the depot storage unit or the rotary storage.

12. The storage arrangement according to claim 11, wherein the input device is configured to determine a sequence of different angular rotation positions for each of the receiving boxes in order to present the receiving boxes in a determined order.

13. The storage arrangement according to claim 11, wherein the input device is configured to display or check a filling level of the receiving boxes based on the detected weight of the one or more receiving boxes, and the input device outputs a notification underline if the weight of the one or more receiving boxes deviates from a maximum or a minimum filling level value.

14. A method for order picking using a depot storage unit comprising:
- a base frame, a rotary table that is rotatably supported on the base frame, the rotary table including a base plate, a drive device operatively connected to the rotary table, a plurality of receiving boxes, at least one sensor device, and a lifting device;
- the method comprising the steps of:
  - rotating, drive device, the rotary table relative to the base frame about an axis of rotation,
  - arranging the plurality of receiving boxes on the base plate in the direction of rotation,
    - detecting, by the sensor device, a weight of at least one of the receiving boxes, wherein the sensor device is configured to detect the weight of the at least one receiving box during a standstill of the rotary table, and
  - lifting, by the lifting device, at least one of the receiving boxes from the base plate, wherein the lifting device is configured to remain stationary relative to the base frame when the rotary table is rotated.

* * * * *